Aug. 22, 1950 — C. L. LUDWIG — 2,519,972
SOLDERING IRON
Filed Jan. 29, 1945 — 2 Sheets-Sheet 1
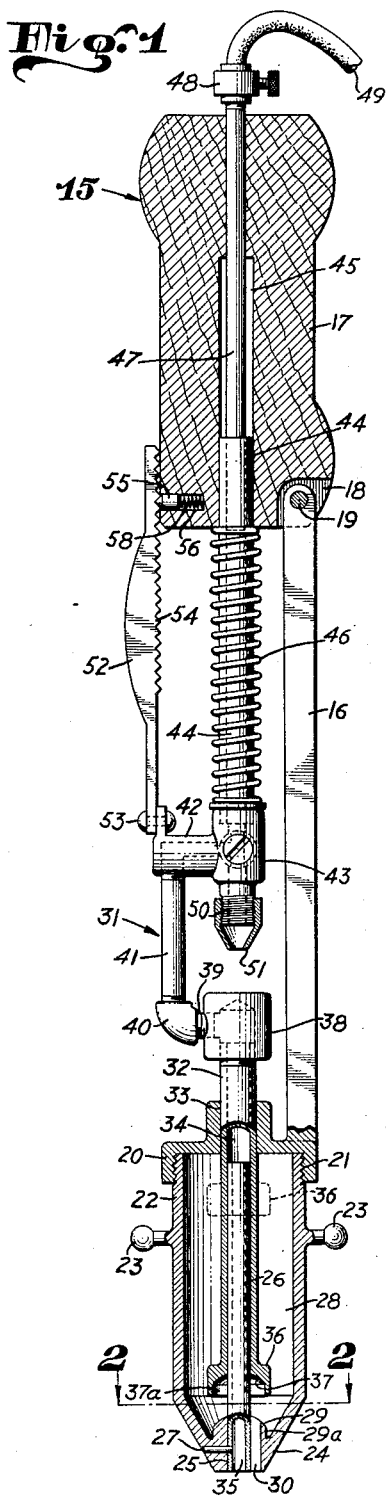
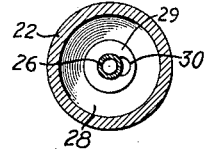
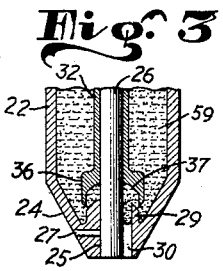
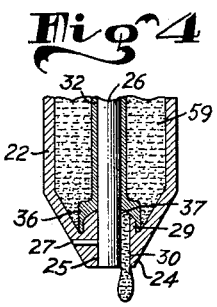
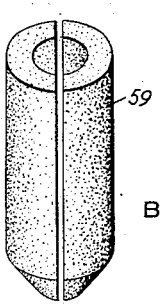
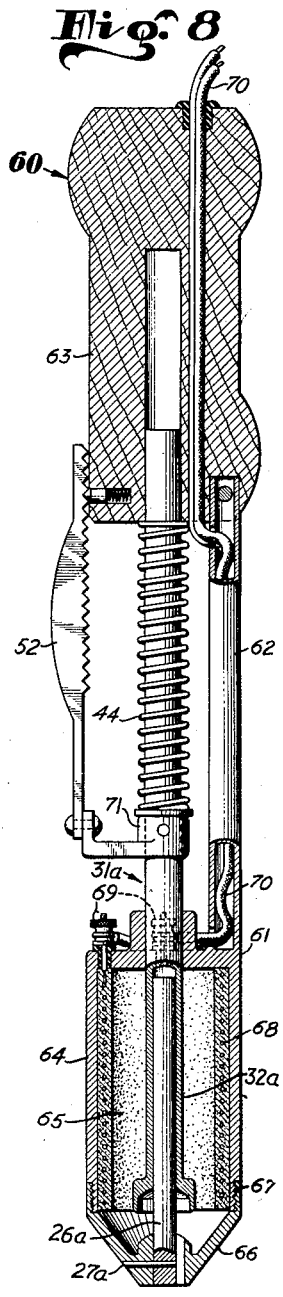
INVENTOR.
CARL L. LUDWIG.
BY C. Lamen Maltby
ATTORNEY.

Aug. 22, 1950     C. L. LUDWIG     2,519,972
SOLDERING IRON

Filed Jan. 29, 1945     2 Sheets-Sheet 2

INVENTOR.
CARL L. LUDWIG
BY
ATTORNEY.

Patented Aug. 22, 1950

2,519,972

UNITED STATES PATENT OFFICE 2,519,972

SOLDERING IRON

Carl L. Ludwig, Los Angeles, Calif.

Application January 29, 1945, Serial No. 575,062

7 Claims. (Cl. 158—25)

This invention relates to measuring and dispensing container devices, and more especially to dispensers adapted for repeat operation, with particular reference to a device adapted for dispensing a molten liquid such as solder, the invention also including the iron for use in the soldering operation.

This application is a continuation in part of my copending application, Serial No. 519,289 filed January 22, 1944, now Patent No. 2,458,035, granted January 4, 1949.

An object of the invention is to provide a simple, practical and efficient article of the character described.

Another object is to provide a combination soldering iron and dispenser for liquid solder heated in the iron.

A further object of the invention is to provide a soldering iron and solder dispenser adapted for dispensing measured quantities of solder, at intervals, as desired.

A further object is to provide a combination soldering iron and molten solder dispenser adapted for dispensing small measured quantities of liquid solder at intervals, such as a single drop at a time.

Another object of the invention is to provide a soldering iron having a self-contained supply of solder in a liquid or molten state, wherein the solder may be dispensed at the hot point of the iron, and capable of operation in any position including a substantially vertical position with the solder being dispensed at the top of the tool.

Another object of the invention is to provide a soldering iron of the character described having a dispensing receptacle portion for a supply of solder which may be heated by the heating means for the iron.

Other objects and advantages will appear and be brought out more fully in the following specification, reference being had to the accompanying drawings, wherein, Fig. 1 is a longituinal sectional view of an embodiment of my invention.

Fig. 2 is a sectional view taken along the line 2—2 of Fig. 1.

Fig. 3 is a fragmentary view, in section, showing the solder dispensing means in a partially actuated position.

Fig. 4 is a view similar to Fig. 3 showing the same in the completely actuated position.

Fig. 5 is a perspective view of a cartridge or supply of solder adapted for insertion in the receptacle portion of the iron shown in Figs. 1 to 4.

Fig. 8 is a view similar to Fig. 1 showing a modified form of the invention.

Figure 6:
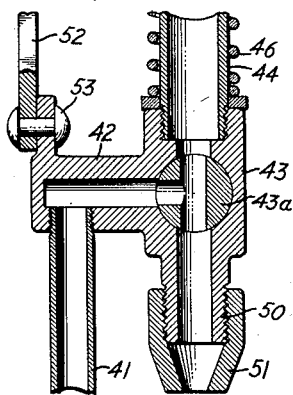
Fig. 6 is an enlarged view, in central section, showing a valve feature also shown in Fig. 1.

Referring more particularly to the drawings, and especially to Figs. 1 to 4, I show a soldering iron 15 which comprises an elongated metallic frame member 16 to which a handle 17 is secured, as by a recess 18 for the end of member 16 and a pin 19 extending through an aperture in the end of the frame member. Frame member 16 is provided with a flanged portion 20 having an internal threaded portion 21 for engagement with the threaded end of a casing and tool point member 22. Member 22 is provided with suitable lugs or ears 23 to facilitate turning movement thereof when being attached to and separated from flange 20.

Member 22 is provided with a tapered point or soldering tool tip portion 24, which portion is provided with a bore 25 through which extends a tubular member 26, a suitable pin 27 being provided in portion 24 for holding tube 26 in place. Casing 22 provides a chamber 28 for the solder to be used in conjunction with the iron. Member 22 is formed with an internal, semi-spherical boss 29, and a bore 30 extends therethrough at one side of tube 26. A dispensing plunger structure 31 is provided and comprises a plunger member 32 which extends through a bore 33 in flange member 20 and is provided with a bore 34 by which it is slidable on tubular member 26, tubular member 26 having a bore 35 in communication therewith. Plunger 32 has an enlarged lower end portion or closure 36 having a semi-spherical recess 37 adapted for interfitting engagement with semi-spherical boss 29. Boss 29 has a cylindrical portion 29a, and recess 37 has a cylindrical portion 37a co-operating portion 29a by which a quantity of solder may be entrapped in recess 37 and forced outwardly through bore 30 when the plunger is actuated, as will be more fully apparent hereinafter.

A cap member 38 is secured as by threaded connection to the upper end of plunger member 32, and a lateral connection 39 is provided therefor, which in turn is connected by an elbow 40 and a pipe 41 to a laterally extending portion 42 of a valve body 43. A pipe 44 is connected to the upper end of valve body 43 and is reciprocable in a bore 45 in handle 17, and positions a spring 46 which is compressed between valve body 43 and handle 17. A pipe 47 extends through the upper end of handle 17 and is connected through a valve 48 to a tube 49, which may be connected to a suitable source of gas, acetylene, or other desired fluid used for the production of heat. Pipe 47 extends into pipe 44 and may be suitably connected thereto so as to be reciprocable therewith and in handle 17, or pipe 47 may be rigidly secured in the handle and have sleeve action engagement with pipe 44, in which case suitable sealing means therebetween will be provided. Body 43 has a threaded end portion 50 to which is suitably secured a burner 51 normally spaced a little distance from cap 38. A thumb piece 52 is secured as by one or more rivets 53 to valve body 43, and the inturned edge portion thereof is notched as at 54. A co-operating indexing device for notches 54 is provided and comprises a complementary notched plunger 55 which is reciprocable in a bore 56 in handle 17 and seated on a spring 58 in the bore.

In Fig. 5 I show a cartridge 59 comprising semi-cylindrical shapes of cold solder which may be inserted in casing member 22 and fit around tubular member 32 until melted by the heat of the iron.

Figure 7:
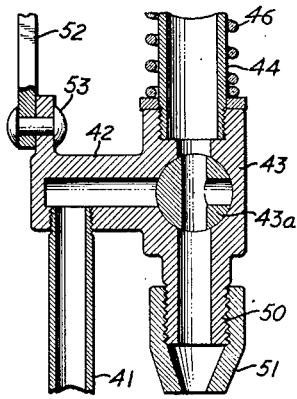
Fig. 7 is a view similar to Fig. 6, showing the valve element in a different position from that of Fig. 6.

The operation of the invention, as so far described, should be clear from the foregoing description. Casing member 22 is provided with a supply of solder 59, as stated, by using the detachable threaded connection at 21, and heat is applied to cap 38 by flame from burner 51 using gas or acetylene supply from tube 49, the valve 43a in valve body 43, which has T-shaped passages, being set in the position shown in Fig. 7. Heat from cap 38 will be transmitted to casing and tool point member 22, melting the solder and heating the tip 24. During this heating period the plunger structure 31 will be retained in the extended position with enlarged end portion 36 of tubular member 26 retaining bore 30 closed and preventing escape of solder until the plunger is actuated. When it is desired to expel a quantity of solder the plunger is retracted by engagement of the thumb with thumb piece 52 permitting a quantity of liquid solder to run into recess 37, as shown in Fig. 3, and a forward movement of the plunger will expel a small quantity of the solder through bore 30 and tip 24, as shown in Fig. 4. The notch configuration 54 will permit the dispensing of small quantities of solder, and the notching arrangement may be such as to dispense as small a quantity as one drop at a time.

If it is desired to apply direct heat from the flame to the solder after it has been dispensed or to the surface which is being soldered, valve 43a may be turned to the position shown in Fig. 6, and the gas will be conducted through pipe 41, cap 38 and tubular members 32 and 26, and flame may be maintained at the end of bore 35.

In Fig. 8 I show a modified form of the invention which comprises the soldering iron 60 having a frame member 61 provided with a tubular portion 62 secured to a handle 63 in any suitable manner. Member 61 has an enlarged cylindrical portion 64 providing a chamber 65 for a supply of solder. A soldering tool point or tip member 66 is detachably secured, as by threaded connection 67, with cylindrical portion 64. Electrical means for heating the solder are provided and comprise a unit 68 formed as a hollow cylinder suitably positioned in cylindrical portion 64 through which extend terminals 69 for conductor wires 70 which are run through the bore in tubular member 62 and through the handle to a source of current. A plunger structure 31a is provided which is substantially similar to structure 31 with the exception that a guide member 26a is provided and secured by a pin 27a to tip member 66. A tubular plunger member 32a is slidable on guide member 26a and extends through an opening in the upper end of cylindrical portion 64. A bracket member 71 is secured to member 32a and thumb piece 52 is suitably secured thereto. Spring 44 in the modification of Fig. 8 is seated on bracket 71 and compressed against handle 63.

Figure 10:
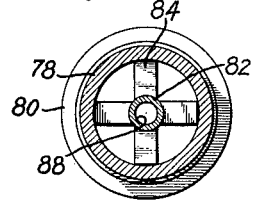
Fig. 10 is a sectional view taken along the line 10—10 of Fig. 9.
Figure 9:
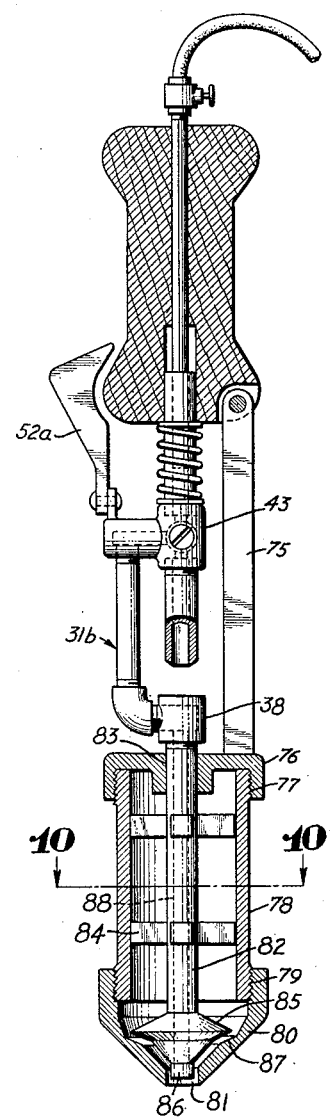
Fig. 9 is a view similar to Fig. 1 showing a further modified form of the invention.

In Figs. 9 and 10 I show another modified form of my invention. In these figures I show an iron having a frame member 75 provided with a flanged portion 76 threaded at 77 for detachable attachment of a casing and solder reservoir member 78. Casing 78 is threaded at 79 for attachment thereto of a taper pointed dispensing nozzle and soldering tool point member 80 which is provided with a dispensing aperture 81. A plunger structure 31b is provided and includes a plunger and valve rod member 82 positioned within casing member 78 and extending through a bore 83 in flange portion 76 of frame member 75. Member 82 is provided with a plurality of radially extending wings or spacers 84 which serve to center member 82 in the casing and to agitate the contained liquid solder.

The lower end of member 82 is cone-shaped, as shown, to form a valve 85, and a cylindrical end extension 86, which extends into aperture 81. Member 80 is provided with an annular seat 87 for valve 85, which seat may be inclined, as shown, or otherwise so formed as to facilitate the expulsion of the liquid solder through aperture 81 in small quantities, such as one drop at a time, at the same time preventing the expulsion of any more of the liquid. Member 82 has a tubular bore 88 open at the end through extension 86, which bore communicates with the interior of a cap member 38 secured to the upper end of member 82. Cap member 38 is similar in structure and function to the similarly numbered cap member in Fig. 1, and the remainder of the iron of Fig. 9 is substantially similar to that of Fig. 1 with the exception of the thumb piece 52a connected to valve body 43 which has the form shown, omitting the notched edge.

Having thus described my invention, what I claim and desire to secure by Letters Patent is:

1. A dispenser as described comprising a casing for a meltable solid which becomes fluid when heated having a dispensing aperture, a plunger having an enlarged end forming a closure and dispensing means including a jet burner for said aperture extending through said casing, and means for heating said plunger and the contents of said casing, means including a tubular bore in said plunger for heating work being treated, and connection means for said bore for a source of gas heat.

2. A dispenser as described comprising a casing for a meltable solid which becomes fluid when heated having a dispensing aperture, a plunger having an enlarged end forming a closure and dispensing means including a jet burner for said aperture extending through said casing, and means for heating said plunger and the contents of said casing, means including a tubular bore in said plunger for heating work being treated, and means connecting said burners with a source of gas supply.

3. An article of the character described comprising an elongated frame having a handle at one end and a casing for a meltable solid which becomes fluid when heated at the other end, said casing having an internal cylindrical boss having a dispensing aperture, a plunger in said casing having a cylindrical recess forming a closure for said aperture, and means for heating said casing, said plunger adapted when actuated to dispense fluid from said casing, whereby the molten solder collected in the recess can be dispensed by the plunger when the article is positioned other than downwardly.

4. In a soldering iron, in combination, a frame, a handle thereon, a casing for a meltable solid which becomes fluid when heated on said frame spaced from said handle and having a tip formed with a dispensing aperture, a hollow dispensing plunger in said casing having an aperture closure and extending through a wall of said casing, a hollow guide stem for said plunger extending through said tip, means to bias said plunger in an aperture closing position, an actuating member on said plunger adjacent said handle, and means to heat said casing, said heating means including a gas jet burner on said actuating member.

5. In a soldering iron, in combination, a frame, a handle thereon, a casing for a meltable solid which becomes fluid when heated on said frame spaced from said handle and having a tip formed with a dispensing aperture, a hollow dispensing plunger in said casing having an aperture closure and extending through a wall of said casing, a hollow guide stem for said plunger extending through said tip, means to bias said plunger in an aperture closing position, an actuating member on said plunger adjacent said handle, and means to heat said casing, said heating means including a jet burner on said actuating member and having a gas supply conduit extending through said handle.

6. In a soldering iron, in combination, a frame, a handle thereon, a casing for a meltable solid which becomes fluid when heated on said frame spaced from said handle and having a tip formed with a dispensing aperture, a hollow dispensing plunger in said casing having an aperture closure and extending through a wall of said casing, a hollow guide stem for said plunger extending through said tip, means to bias said plunger in an aperture closing position, an actuating member on said plunger adjacent said handle, and means to heat said casing, said heating means including a jet burner on said actuating member and a jet burner in said tip.

7. In a soldering iron, in combination, a frame, a handle thereon, a casing for a meltable solid which becomes fluid when heated on said frame spaced from said handle and having a tip formed with a dispensing aperture, a hollow dispensing plunger in said casing having an aperture closure and extending through a wall of said casing, a hollow guide stem for said plunger extending through said tip, means to bias said plunger in an aperture closing position, an actuating member on said plunger adjacent said handle, and means to heat said casing, said casing having an inwardly extending boss through which said aperture extends, said closure having an interfitting boss cavity.

CARL L. LUDWIG.

REFERENCES CITED

The following references are of record in the file of this patent:

UNITED STATES PATENTS

| Number | Name | Date |
| --- | --- | --- |
| 223,945 | Palmer | Jan. 27, 1880 |
| 223,948 | Palmer | Jan. 27, 1880 |
| 761,010 | Rodgers | May 24, 1904 |
| 777,711 | Ackerman | Dec. 20, 1904 |
| 1,127,970 | Dryfoos | Feb. 9, 1915 |
| 1,341,497 | Davies | May 26, 1920 |
| 1,400,148 | Frum | Dec. 13, 1921 |
| 1,928,129 | Hornack | Sept. 26, 1933 |
| 2,068,728 | Amos | Jan. 26, 1937 |